May 11, 1926. 1,584,384
E. G. LEDYARD
BOTTOM DUMP TRAILER
Filed July 11, 1923 2 Sheets-Sheet 1
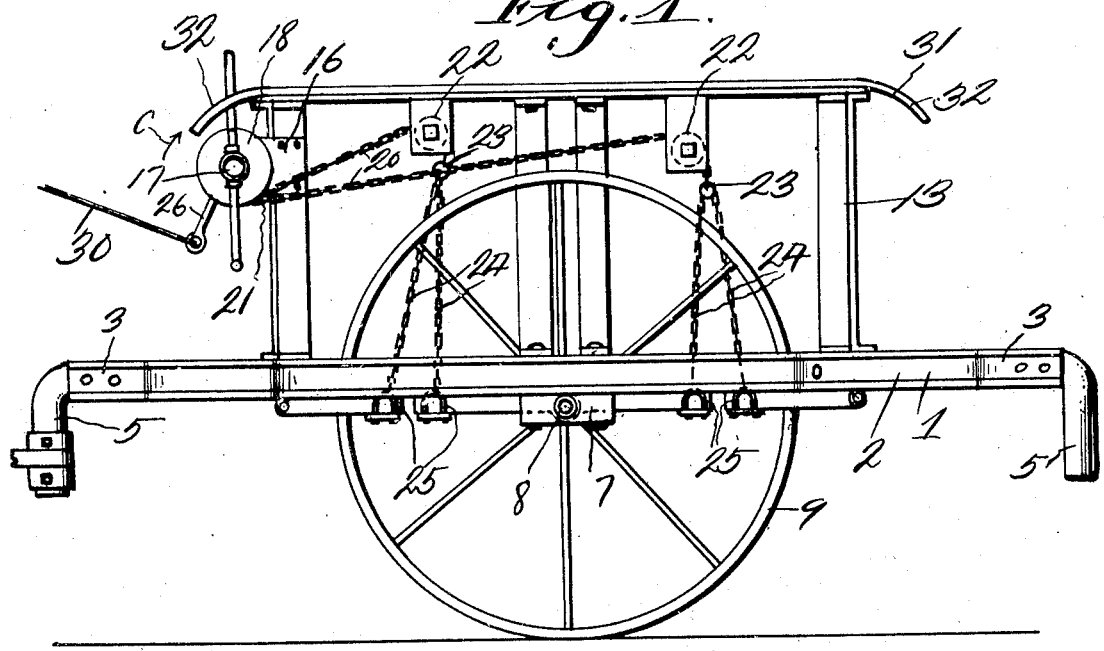
Fig.1.
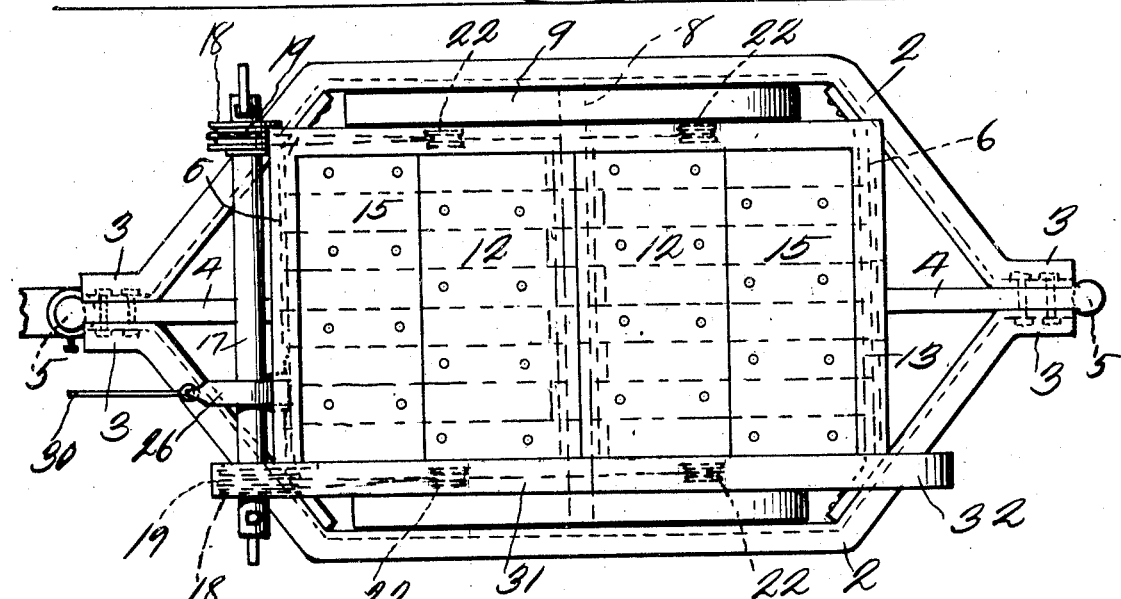
Fig.2.
Inventor
E. G. Ledyard
By 
Attorney May 11, 1926.
E. G. LEDYARD
BOTTOM DUMP TRAILER
Filed July 11, 1923    2 Sheets-Sheet 2
1,584,384
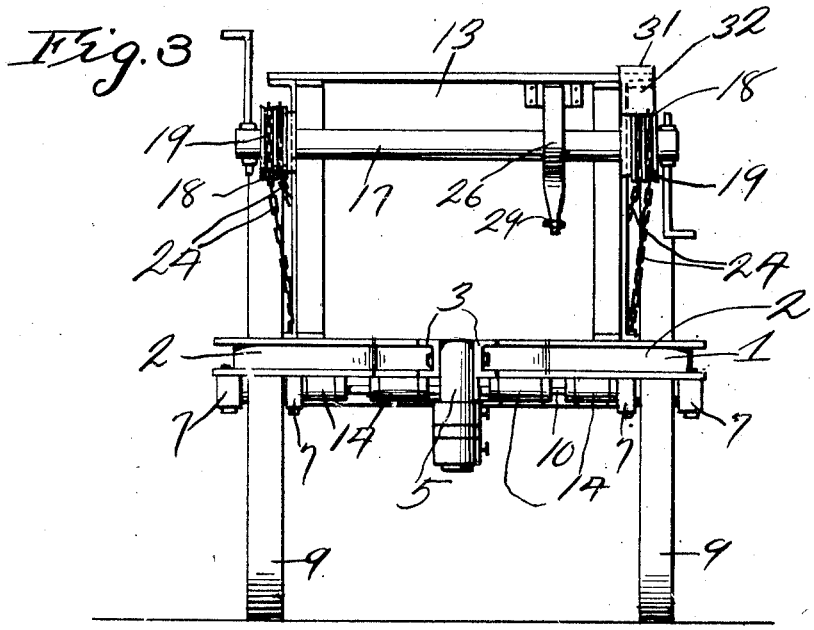
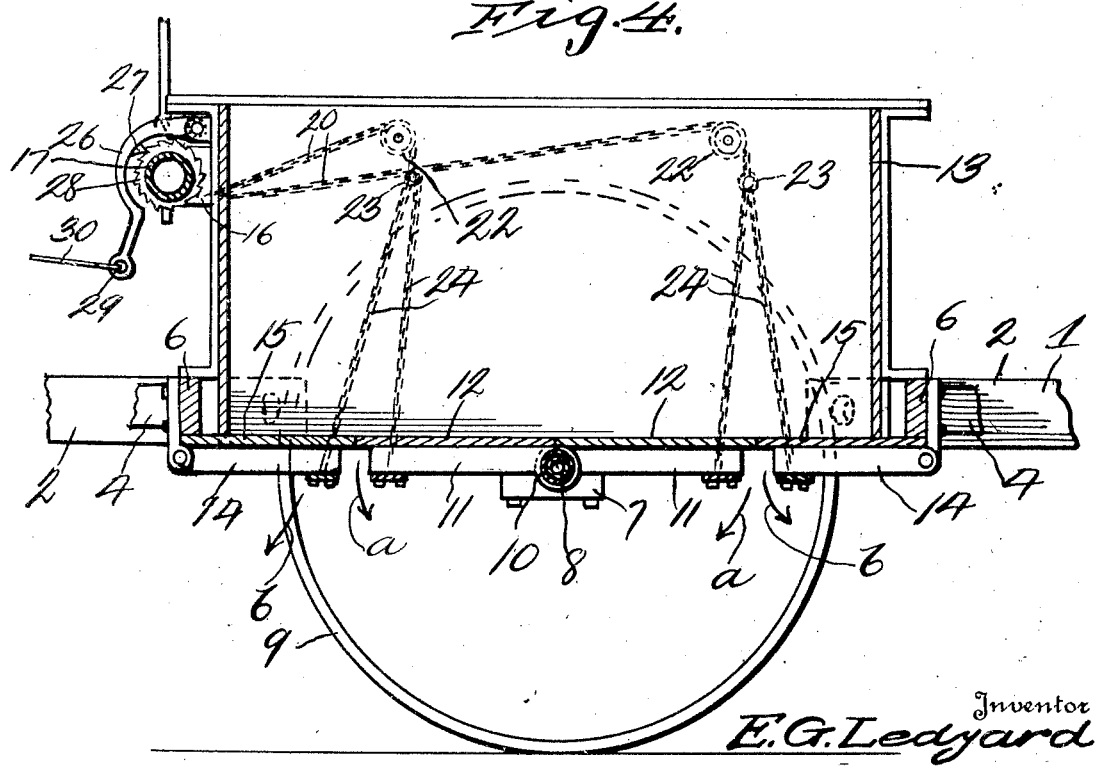
Inventor
E. G. Ledyard
By D. Swift
Attorney Patented May 11, 1926.

1,584,384

UNITED STATES PATENT OFFICE.

ELISHA G. LEDYARD, OF SIOUX FALLS, SOUTH DAKOTA.

BOTTOM-DUMP TRAILER.

Application filed July 11, 1923. Serial No. 650,841.

The invention relates to bottom dump trailers, and has for its object to provide a device of this character comprising a body portion supported in a horizontally disposed wheel supported frame, which frame has its ends provided with downwardly extending goose necks adapted to be attached to a clevis of a tractor or the like. The bottom of the body is formed from hingedly mounted sections, two of said sections being hingedly connected to the axle of the trailer, and the other sections hingedly connected to the transversely disposed bars of the frame, said hinged sections being held in closed position by means of chains, which chains extend around a rotatable drum, and by means of which drum the hinged sections may be moved to closed position by imparting pulling forces on the chains which are connected to the hinged sections and to the drum.

A further object is to provide pawl and ratchet means for holding the drum against rotation and the hinged sections in closed position. Also to provide means for releasing the drum from a distance, for instance from the tractor, thereby allowing the operator of the tractor to dump the trailer without getting off the tractor.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the trailer.

Figure 2 is a top plan view.

Figure 3 is a front elevation of the trailer.

Figure 4 is a vertical longitudinal sectional view through the trailer.

Referring to the drawing, the numeral 1 designates a horizontally disposed frame, which frame is preferably formed from channel iron, and from U-shaped sections 2. The arms of the U-shaped sections 2 converge and terminate in parallel arms 3, between which parallel arms the inwardly extending horizontal portions 4 of goose necks 5 are secured. The inner ends of the arms 4 are secured to transversely disposed bars 6, which connect the U-shaped portions 2 of the frame together, therefore it will be seen that a rigid frame is provided, which will stand considerable strain and shock incident to rough usage. Secured to the under side of the frame 1 are spaced bearing members 7, in which is rotatably mounted an axle 8 on which the supporting wheels 9 are rotatably mounted. Surrounding the axle 8 is a sleeve 10, on which sleeve the hinges 11 are hinged, which hinges have secured thereto the bottom sections 12, therefore it will be seen that when the bottom sections 12 are released they move downwardly in the direction of the arrows $a$ at their free ends. Hingedly connected to the transversely disposed bars 6 forwardly and rearwardly of the body 13 are hinges 14, which hinges extend inwardly under the body 13 and have secured to their upper side bottom sections 15, which sections, when in closed position engage the under side of the body 13 and are limited in their upward movement towards closed position and in horizontal relation to the bottom sections 12. When the bottom sections 15 are released they move downwardly at their free ends in the direction of the arrow $b$, thereby allowing, upon the simultaneous opening thereof, with the sections 12, the contents of the dump body 13 to be dumped on the ground.

Rotatably mounted in bearings of brackets 16 carried by one end of the body 13, is a shaft 17, which shaft adjacent its ends is provided with drums 18, around which drums chains 19 extend. Chains 19 are connected to the ends of chains 20 at 21, and the chains 20 extend over rollers 22 at the sides of the body 13. The chains 20 have connected at 23 thereto chains 24, which extend downwardly and are connected by means of U-bolts 25 to the hinged bottom sections 12 and 15, therefore it will be seen by imparting a pull on the chains 19 by rotating the shaft 17 in the direction of the arrow $c$ that the bottom sections 12 and 15 will be moved to closed position. However when the shaft 17 is released by means of the pivoted lever 26 carried by the body 13, which lever is provided with a tooth 27, which cooperates with the ratchet wheel 28, the bottom sections 12 and 15, will, under the load within the body 13, swing downwardly, thereby allowing the load within the body 13 to be dumped on the ground between the wheels 9. Connected to the lever 26 at its free end 29 is a cable 30, which cable may lead to any suitable position, however preferably to the vehicle which is pulling the dump wagon, and consequently it will be seen, that the operator, while located on the vehicle which is pulling the dump wagon may grasp the cable 30, impart a pull thereon and release the bottom dump sections 12 and 15. If so desired the upper side of body 13 may be provided with a guard plate 31. The ends 32 of the guard plate curve downwardly over the drums 18 and form means for preventing the rollers under the elevator of an elevating grader from catching under the corners of the angle iron top of the body.

From the above it will be seen that a bottom dump trailer is provided wherein the bottom sections are hingedly mounted on the axle of the trailer and controlled by chains in a manner whereby the sections may move to position parallel with the body and frame of the wagon during an unloading operation, thereby allowing the trailer to easily pass from the dumped load. It will also be seen that means is provided whereby the trailer may be easily attached to a tractor and trailers attached to each other for instance in forming a vehicle train. The axle is disposed centrally of the trailer, consequently a load disposed within the body 13 will be easily distributed and it will also be seen that the dumping operation may be controlled from another vehicle, such for instance as the tractor to which the dump wagon is attached, thereby obviating the necessity of the operator of the tractor leaving his position or stopping his machine during the dumping operation.

The invention having been set forth what is claimed as new and useful is:—

The combination with the body of a dump trailer having a transversely disposed axle beneath the body, a sleeve mounted on said axle and in which the axle rotates, and supporting wheels for the axle, of inner and outer hinged bottom sections carried by the body, the inner hinged sections being hingedly mounted on the sleeve of the axle, the outer sections being hingedly connected at their outer sides at points spaced outwardly from the ends of the body and means for controlling said hinged bottom sections.

In testimony whereof I have signed my name to this specification.

ELISHA G. LEDYARD.